(12) United States Patent
Koizumi et al.

(10) Patent No.: US 10,318,672 B1
(45) Date of Patent: Jun. 11, 2019

(54) SYSTEM FOR CONTROLLING AND DIRECTING THE FLOW OF A CHARGED PARTICLE THROUGH A DEVICE

(71) Applicant: Arkansas State University—Jonesboro, State University, AR (US)

(72) Inventors: Hideya Koizumi, Jonesboro, AR (US); Kenichiro Saito, Tokyo (JP)

(73) Assignee: Arkansas State University—Jonesboro, Jonesboro, AR (US)

( * ) Notice: Subject to any disclaimer, the term of this patent is extended or adjusted under 35 U.S.C. 154(b) by 112 days.

(21) Appl. No.: 15/423,525

(22) Filed: Feb. 2, 2017

Related U.S. Application Data

(63) Continuation-in-part of application No. 13/911,024, filed on Jun. 5, 2013, now abandoned.

(60) Provisional application No. 61/655,881, filed on Jun. 5, 2012.

(51) Int. Cl.
*G06F 7/60* (2006.01)
*G06F 17/10* (2006.01)
*G06F 17/50* (2006.01)
*H01J 49/06* (2006.01)

(52) U.S. Cl.
CPC .......... *G06F 17/5009* (2013.01); *H01J 49/06* (2013.01); *G06F 2217/16* (2013.01)

(58) Field of Classification Search
None
See application file for complete search history.

(56) References Cited

U.S. PATENT DOCUMENTS 7,096,167 B2 * 8/2006 Zhou ...................... G06F 19/16
702/19

OTHER PUBLICATIONS

Bokhari, Shahid H. et al., "Parallelizing a DNA Simulation Code for the Cray MTA-2", 2002, Proceedings of the IEEE Computer Society Bioinformatics Conference (CSB'02), IEEE. (Year: 2002).*
Wordelman, Carl J et al,, "Integration of a Particle-Particle-Particle-Mesh Algorithm with the Ensemble Monte Carlo Method for the Simulation of Ultra-Small Semiconductor Devices", Feb. 2000, IEEE Transactions on Electron Devices, vol. 47, No. 2, IEEE. (Year: 2000).*

(Continued)

*Primary Examiner* — Cedric Johnson
(74) *Attorney, Agent, or Firm* — Schrantz Law Firm, PLLC; Stephen D. Schrantz

(57) ABSTRACT

The system effectively manipulates the operation of a charged particle flow device by approximating the total force on each ion during a trajectory calculation. The system applies the method in massively parallel general-purpose computing with GPU (GPGPU) to test its performance in simulations with thousands to over a million ions. The method calculates the forces on an ion using ions within an active region near the ion of interest. To decrease computation time, the method approximates the forces by calculating the ion-ion interactions within a first zone and the ion-ion cloud interactions within a second zone. The system adjusts settings of the charged particle flow device to affect the flow and positioning of the charged particles. Such setting may include adjusting the positioning of the charged plates, adjusting the voltage of the plates, and adjusting the pressure within the charged particle flow device.

20 Claims, 16 Drawing Sheets

(56) References Cited

OTHER PUBLICATIONS

Gibbon, Paul et al. "Long-Range Interactions in Many-Particle Simulation", 2002, Quantum Simulations of Complex Many-Body Systems: From Theory to Algorithms (Lecture Notes), John von Neumann Institute for Computing. (Year: 2002).*

Sutmann Godehard et al, "A Particle-Particle Particle-Multigrid Method for Long-Rage Interactions in Molecular Simulations", Apr. 9, 2005, Computer Physics Communications, 169, Elsevier B.V. (Year: 2005).*

Birdsall, C.K., "Particle-in-Cell Charged-Particle Simulations, Plus Monte Carlo Collisions with Neutral Atoms, PIC-MCC", Apr. 1991, IEEE Transactions on Plasma Science, vol. 19, No. 2, IEEE. (Year: 1991).*

Ogbonna, Nneoma, "Molecular Dynamics Simulation", May 2004, African Institute for Mathematical Sciences. (Year: 2004).*

Harter, Arne et al. "Cold Atom-Ion Experiments in Hybrid Traps", 2014, Contemporary Physics 55(1). (Year: 2014).*

Saito, Kenichiro et al., "A Hybrid Approach to Calculating Coulomb Interactions: An Effective and Efficient Method for Optimization of Simulations of Many Ions in Quadrupole Ion Storage Device with SIMION", Mar. 30, 2012, International Journal of Mass Spectrometry, Elsevier B.V. (Year: 2012).*

Saito, Kenichiro et al. "Application of Parallel Hybrid Algorithm in Massively Parallel GPGPU—The Improved Effective and Efficient Method for Calculating Coulombic Interactions in Simulations of Many Ions with SIMION", Jul. 26, 2012, J. Am. Soc. Mass Spectrom, American Society of Mass Spectrometry. (Year: 2012).*

Ohmura, Itta et al., "MDGRAPE-4: A Special-Purpose Computer System for Molecular Dynamics Simulations", 2014, Philosophical Transactions of the Royal Society, Royal Society Publishing. (Year: 2014).*

\* cited by examiner

SYSTEM FOR CONTROLLING AND DIRECTING THE FLOW OF A CHARGED PARTICLE THROUGH A DEVICE

CROSS-REFERENCE TO RELATED APPLICATIONS

This application claims priority to and is a continuation in part of U.S. patent application Ser. No. 13/911,024 filed on Jun. 5, 2013 entitled PARALLEL HYBRID ALGORITHM IN MASSIVELY PARALLEL GPGPU AND METHOD FOR CALCULATING COULOMBIC INTERACTIONS IN SIMULATIONS OF MANY IONS which is a continuation in part of U.S. Patent Application No. 61/655,881 filed on Jun. 5, 2012 entitled PARALLEL HYBRID ALGORITHM IN MASSIVELY PARALLEL GPGPU AND METHOD FOR CALCULATING COULOMBIC INTERACTIONS IN SIMULATIONS OF MANY IONS.

STATEMENT REGARDING FEDERALLY SPONSORED RESEARCH OR DEVELOPMENT

This invention was made, in part, with government support under Grant No. N00164-11-1-2001 awarded by the U.S. Department of Defense. The government has certain rights in the invention.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of Invention

The present invention relates to a method in massively parallel general-purpose computing with GPU (GPGPU) in simulations of at least two ions, including but not limited to thousands to over a million ions.

(1) Background of the Invention

SIMION is an ion optics simulation program that is a highly-versatile, windows-based, computer simulation program. SIMION has been used to optimize the design of scientific instruments such as mass spectrometers and ion mobility devices.

Quality of computational modeling of instrumentation designs depends on how accurately the model reflects reality. In general, models of a complicated process within a mass spectrometer are often oversimplified because the high computational cost. The major cause is the number of ions involved in the process. When there are n ions present, there will be operations in the scales of $n^2/2$ depending on the efficiency of an algorithm. For simulations containing a large number of ions, the simulation requires a high computational cost to evaluate the total force acting on each ion at every step. SIMION is used here as one example for demonstrating the present invention's results. However, the present invention or any other suitable program may demonstrate results of the present invention.

SUMMARY OF THE INVENTION

The present invention is a new approach to effectively approximating the total force on each ion during a trajectory calculation in mass spectrometry device simulations. Although the present invention can be easily applied to any two-body interactions, the Coulombic interactions were chosen for simplicity. The method can be applied to a non-uniform grid system such as triangular mesh using Cartesian coordinate of each grid's position or center of mass. For the sake of simplicity, cube or rectangular prisms were used. The methods described herein may also be implemented to an algorithm for solving a Poisson equation.

As described in FIG. 1, possible interactions between an ion and all the other ions are classified into short-range and long-range interactions in the model. Since the acceleration of an ion 102 is largely influenced by nearby ions, the short-range interactions are treated by explicit two-body interactions represented by the Coulomb's Law (Eq. 1).

$$F_i = \sum_j^N \frac{1}{4\pi\epsilon_0} \frac{q_i q_j}{r^2} \hat{r}_{ji} (i \neq j) \qquad \text{Eq 1}$$

where the vector, $F_i$, represents the exact total force of total interactions between the ion of interest, i, and other ions, j; $q_i$ is the charge of ion i; r is the separation of two charges carried by ions, i and j; $\hat{r}_{ji}$ is the unit directional vector from the charge j to i; and $\epsilon_0$ is the vacuum permittivity. Individual pairwise interactions, when ions are far from the ion in consideration, are much less important compared to the ones in the ion's neighborhood. However, the collections of these long-range interactions often contribute significantly to the trajectories of ions. Therefore, it is ideal to approximate the long-range interactions collectively by approximating the ions that are somewhat far away from the particle of interest as a "charge diffused cloud" 104. A charge diffused cloud 104 may be defined as a collective charge distribution of ions in a cubic space called a block 106. The blocks 106 are fixed in a location and do not "move" during the course of the simulation. The blocks 106 are completely independent of computational grids used to calculate the potential array. The charge distribution in a block 106 changes over time as ions 102 move in and out. Given the knowledge of the current position of the ion 102 of interest, the rest of the ions can be categorized into "ions in the neighborhood," "ions sufficiently far away," and ions far away enough that can be ignored in the force calculation. The intermediate ions are the ones grouped into charge diffused clouds by their locations at the current time step.

A charge diffused cloud 104 is approximated as the spherical surface on which the net charge in the block 106 is evenly distributed, and is centered at the center-of-charge 108. If the average distance of all ions from the center-of-charge location is taken as the radius, the cloud's surface in the neighboring block can extend over the block's boundary, and may overlap with the current ion (also called the ion of interest). If the current ion from the neighboring block happens to be in the cloud, the interaction between the ion and the neighboring cloud cannot be calculated accurately. To avoid this issue, all interactions between current ions and ions within immediate neighboring blocks are treated as explicit two-body interactions. Alternatively, the radius of charge diffused cloud can be approximated to be either: 1) the average distance if the cloud's surface stays in the block, or 2) the shortest distance from the center-of-charge to the block's boundary. Because the calculation results were not sensitive to both cases, explicit two-body interactions were restricted to a single block in all hybrid algorithm calculations.

The present invention also works with a relatively low number of ions. The method was also applied in massively parallel general-purpose computing with GPU (GPGPU) to test its performance in simulations with ions numbering in the range of thousands to over a million. Extra care was taken to minimize the barrier synchronization and data transfer between the host (CPU) and the device (GPU) memory. Full advantage of the latency hiding was taken by assigning an appropriate number of blocks. Parallel codes in CUDA C++ were written and implemented to SIMION via the user-defined Lua program.

The parallel hybrid algorithm was tested with a couple of basic models and the performance was analyzed by comparing it to that of the original fully explicit method written in serial codes. The Coulomb explosion simulation with 128,000 ions was completed in 309 seconds; that is over 700 times faster than 63 hour completion time using the original explicit method, in which two-body Coulomb interactions explicitly were evaluated with an ion with each of all other ions. The simulation of 1,024,000 ions was completed in 2,650 seconds. In another example, the hybrid method was applied in a simulation of ions in a simple quadrupole ion storage model with 100,000 ions, and it only took less than 10 days. It is estimated that the same simulation is expected to take 5~7 years by the explicit method in serial code.

It is an object of the present invention to reduce the computational load of such calculations.

It is another object of the present invention to efficiently approximate the total force acting on an ion by removing the need to calculate its interactions with all other ions explicitly.

It is another object of the present invention to use linked lists for storing ion data to efficiently calculate the data.

DETAILED DESCRIPTION

Figure 1:
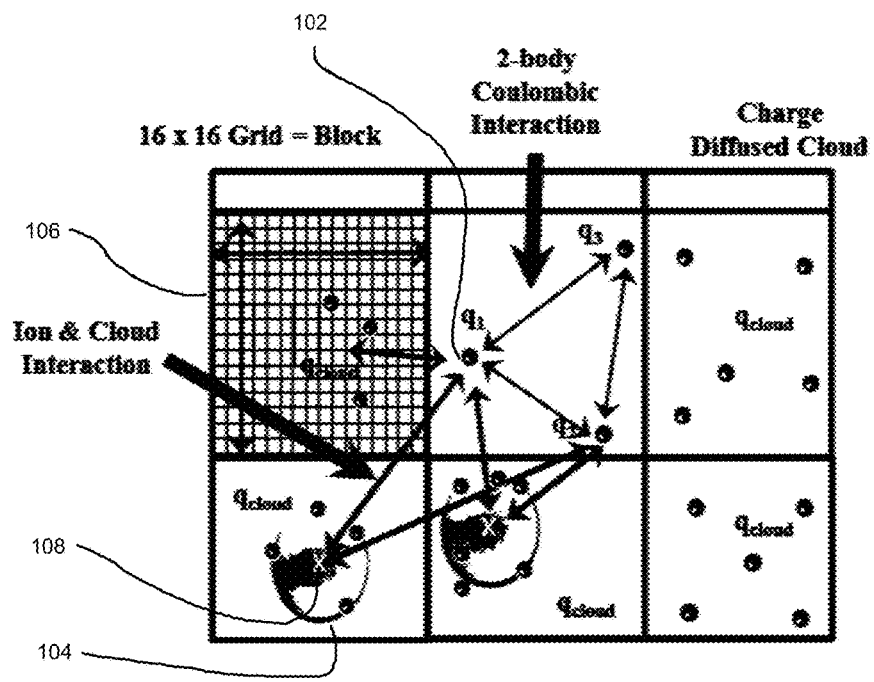
FIG. 1 is a basic schematic of interactions included in the hybrid algorithm. The charge diffused cloud is determined based on the ions located in the cubic grid system at the current time step.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Quality of computational modeling of instrumentation designs depends on how accurately the model reflects reality. In general, the models of a complicated process that take place in a mass spectrometer are often oversimplified because of their high computational cost. The major cause is the number of ions involved in the process. When there are n ions present, there will be operations in the scale of $n^2/2$ depending on the efficiency of an algorithm. Depending on how the program is written, the operations may be completed in a CPU or a GPU. To complete trajectory calculations, the total force on each ion should be calculated by evaluating interactions with every other ion, and the profile of all ions updated at every time step. As the technology used in mass spectrometry advances, increased sophistication in multi-physics modeling and efficiency in a computational method becomes necessary to simulate the highly sensitive new instruments.

One purpose of the present invention is to improve the efficiency of computing two-body interactions. For a simulation containing a large number of ions, a massive weight is on the evaluation of the total force acting on each ion at every time step. This problem is present in the evaluation of two-body interactions. To address this problem, the inventors first developed a serial hybrid algorithm to run on a CPU.[1] The methods of computations in serial mode are summarized below.

[1] Saito K., Reilly P. T. A., Koizumi E., Koizumi H., Int. J. Mass Spectrom. 315(1), 74-80 (2012).

The present invention predicts the positioning and the flow of the charged particles. The present invention reduces the calculations required to predict the positioning to enable the user to obtain results in a timely manner. The prediction of the positioning and flow of the charged particles affects the operation and design of a charged particle flow device. Such charged particle flow devices may include, but are not limited to, a mass spectrometer (MS), a differential mobility analyzer (DMA), an ion mobility device, electrical lens system, quadrupole ion storage device, or other charged particle flow device.

Such charged particle flow devices provide charged plates that direct the flow of the charged particles through the device. The simulation predicts the location and flow of the charged particles of the device. The user may wish to direct particles to a particular location or to direct the flow of the particles.

To adjust the flow or positioning of the particles the settings at which the charged particle flow device operates may require adjustments. The settings of the charged particle flow device may also require adjustment to redirect the charged particles or the flow of the particles. The system reviews the prediction of the particles. The system then adjusts the settings of the charged particle flow device for the desired flow and positioning of the charged particles.

The charged particle flow device provides at least one charged plate. The system determines that the flow of a charged particle will be altered by an adjustment of the positioning of the plate and/or the voltage applied to the plate. The system then determines the change in the setting that will achieve the user's desired results. The system then adjusts the positioning of the charged plate, adjusts the voltage applied to the plate, or adjusts the positioning and the charge of the plate.

In another embodiment, the pressure within the charged particle flow device affects the flow of the charged particles. The pressure within the charged particle flow device affects the force exerted on the particles as indicated within the simulation. The system predicts the positioning and the flow of the charged particles through the device. To achieve the results, the system adjusts the pressure within the charged particle flow device to direct the particles for the desired results. Such adjustment in pressure changes the force acting upon the charged particles.

Hybrid Algorithm Procedure

Geometrical Parameter Input for Grids and Blocks—Regions where Charge Clouds Will be Defined.

One must define the simulation domain: $(x_{min}, x_{min})$, $(y_{min}, y_{min})$, and $(z_{min}, z_{max})$, and the maximum number of blocks 106, $(n_{xmin}, n_{ymin}, n_{zmin})$, then calculate the block dimension, $(b_x, b_y, b_z)$. One must define the limit of short-range interactions, $(l_x, l_y, l_z)$, and block units; and long-range interactions, $(m_x, m_y, m_z)$, and block units. The ions in the blocks, $\pm l_x$ blocks, from the block that the current ion is in, in the x direction, $\pm l_y$ blocks in the y direction, and $\pm l_z$ blocks in the z direction are considered in the short-range. The ions in the blocks outside of this range and those within the similarly defined long-range by $(m_x, m_y, m_z)$ limits are considered to make significant contribution to the force calculations and be treated as the charge diffused cloud. The set of all these blocks, including the one that a current ion is in, makes up an active region for the current ion.

Sequencing the blocks for the simulation domain containing $n_{xmin} \times n_{ymin} \times n_{zmin}$ blocks is done according to:
For i=1, . . . , $n_{xmax}$,
For j=1, . . . , $n_{ymax}$,
For k=1, . . . , $n_{zmax}$,
$k+j \times n_{zmax} + i \times n_{zmax} \times n_{ymax}$ append to $N_{ind}$.

Active Particle List
$(x_i, y_i, z_i, q_i)$ for $1 \leq i \leq n$ for n total number of ions, which is the file containing initial coordinates and charges of all ions, is provided as a part of the linked data structure and accessed by the array number assigned to each ion throughout the simulation. The array number set, at this initial stage, includes all positive integers less than or equal to n and stored as List(Active_Particles). Particles may be lost on the simulation domain boundary (for example, by getting stuck on an electrode) in the course of simulation; hence, the ones still active in the domain account for the newly updated list at each time step.

Charge Diffused Cloud Data
For each block, $i \in N_{ind}$, using the data for all ions in the block, $N^i_{ind}$, calculate the total charge:

$$Q_T(i) = \sum_{j \in N^i_{ind}} q_j$$

and its center of charge coordinates for the x, y, and z coordinates as shown below:

$$x_{center}(i) = \frac{\sum_{j \in N^i_{ind}} q_j x(j)}{Q_T(i)}$$

and store them in the data storage space accessible by the block reference numbers.

Ion-Ion Interactions
For each ion, $j \in$ List(Active_Particles), one must determine the ions (in the short-range) that account for ion-ion interactions with the ion in consideration. The short-range is given by the previously defined short-range limit; the cube of size $(2l_x+1) \times (2l_y+1) \times (2l_z+1)$ is centered at the location of the current ion. The ions (pointers) in this range are stored in $N_{short}$ temporarily. Eq. 1 is used to calculate the force with for the ion $j \in N_{short}$.

Ion-(Charge Diffused Cloud) Interactions
All block reference numbers of blocks are saved inside the long-range limits, for example, outside the short-range and within the $(2m_x+1) \times (2m_y+1) \times (2m_z+1)$ cube as defined earlier. Again, the ions outside of the "active region" will be ignored in the force calculation. Eq. 1 with $q_j = Q_T$ is used to calculate the ion-cloud interactions. Finally, calculate the acceleration, a=FIM for the current ion. One must update the particle information, determine the lost particles, and update the List(Active_Particles).

Even without GPU acceleration, an improvement in an order of magnitude was noted.[1] One of the most popular GPUs $150) in the similar NVIDIA product line was added to a desktop system similar to the one these inventors used for a previous study. The present invention implements a code specific to the system of multiple GPUs being built for designing and optimizing the new instruments with additional new modeling techniques.

The present invention also utilized a generalized version of the hybrid algorithm mentioned above to arbitrary choice of non-uniform computing blocks that are often required for solving specific physics problem. Typically, non-uniform blocks include triangular mesh and polygons. The required step is to classify all non-uniform blocks into groups that are in the rectangular prism block discussed above. The grouping of the non-uniform blocks can be done in using Cartesian coordinates of the center of a non-uniform block or other methods for grouping the non-uniform blocks. If the rectangular prism block contains a center of a non-uniform block, then that non-uniform grid belongs to the group assigned with the rectangular prism block. Once this grouping is performed, then long range and short range interactions are calculated as mentioned above. However, each rectangular prism block may contain many center of charges. Note that none of these grid conversions are necessary if the "Do while loop" is fast enough. In that case, the interactions on current ions are calculated by explicit two body methods if the distance between centers of non-uniform blocks are less than the cutoff length. If the distance between two non-uniform blocks exceed that of the cutoff length, then, all of the ions belonging to that block are replaced by their center of charges as described above. Once all of the long range interactions and short range interactions are calculated, then move on to the next ion as described above until forces acting on all ions are calculated. This simplified method also applies to the uniform block as well.

A. Computational Method.

All GPGPU simulations were performed on a 64-bit, windows-based personal computer system with a 3.4 GHz Intel Core i7 quad processor with 4 GB of RAM, equipped with a NVIDIA GForce GTX460 (Fermi) graphic processor unit with 1 GB of RAM. The parallel codes are written in CUDA C++ and implemented to the SIMION version 8.1 through user-defined "Lua"[2] (the embedded scripting language in SIMION) program. A single core was assigned to process the code with highest priority for accurate measurement of CPU processing time, including GPU waiting time.

[2]Ierusalimschy R., de Figueiredo L. H., Celes W., "Lua 5.1 Reference Manual", ISBN 85-903798-3-3 (2006).

The performance was evaluated by comparing the CPU processing time. Two basic designs include: 1) a Coulomb explosion model without electrodes; and 2) a model of a quadrupole ion storage device.

Hybrid Process and Application in Massively Parallel Architecture

The complete discussion on how the hybrid process works can be found in Saito K., Reilly P. T. A., Koizumi E., Koizumi H., Int. J. Mass Spectrom. 315(1), 74-80 (2012), the contents of which are incorporated herein by reference as if set forth verbatim. In the hybrid approach, the computational load was cut down by efficiently approximating the total force acting on an ion by calculating its interactions with all other ions. As in serial computation, the parallel hybrid method classifies these other ions into groups depending on the distance from the current ion in consideration in exactly the same manner.

In one embodiment, the method of the present invention may be implemented in SIMION trajectory simulation program through user-defined Lua (embedded scripting language) program that can call for processes run outside of SIMION. In another embodiment, the present invention may be implemented independent of SIMION. In parallel version of the hybrid algorithm, there are two main processes carried out on a GPU: 1) Coulomb interactions (ion-ion, and ion-cloud interactions); and 2) the evaluation of the profiles of charge diffused clouds by blocks. For either process, ions are divided into groups and their profiles are called in to the specified GPU kernel. In developing parallel CUDA C++ codes, it is of extreme importance to reduce the time used in the barrier synchronization to optimize the code's overall performance and to minimize data transfer between the host (CPU) memory and the device (GPU) memory. In addition, full advantage of the latency hiding was taken to eliminate the process waiting time. These techniques are critical for efficient parallel executions on massively parallel computing systems. After repeatedly testing the codes, significant improvements have been reached.

Figure 2:
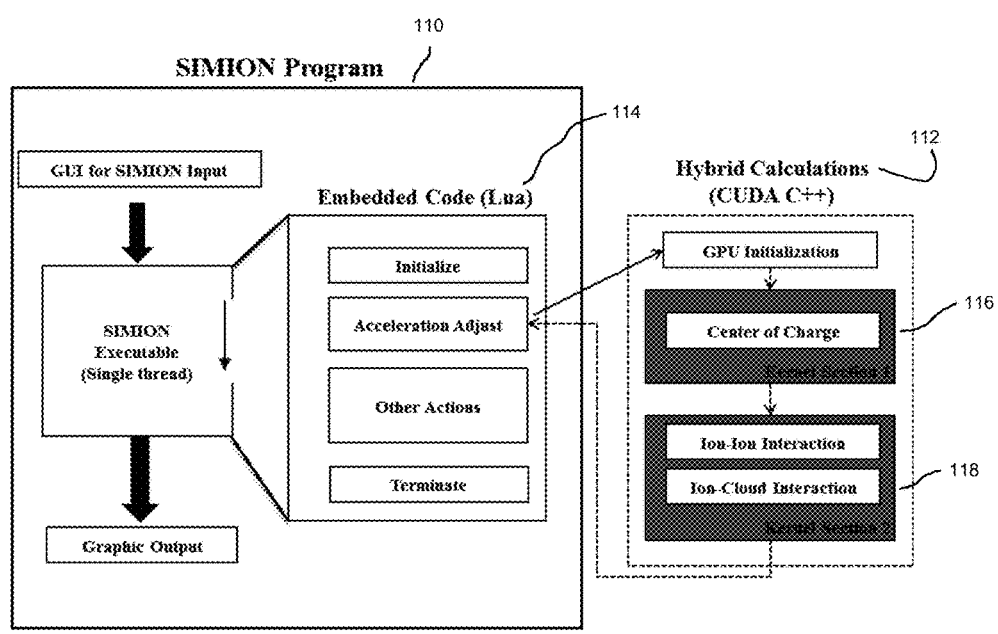
FIG. 2 is a schematic flow diagram depicting implementation of the parallel CUDA C++ hybrid codes to SIMION trajectory calculation via the user-defined Lua program.
Figure 3:
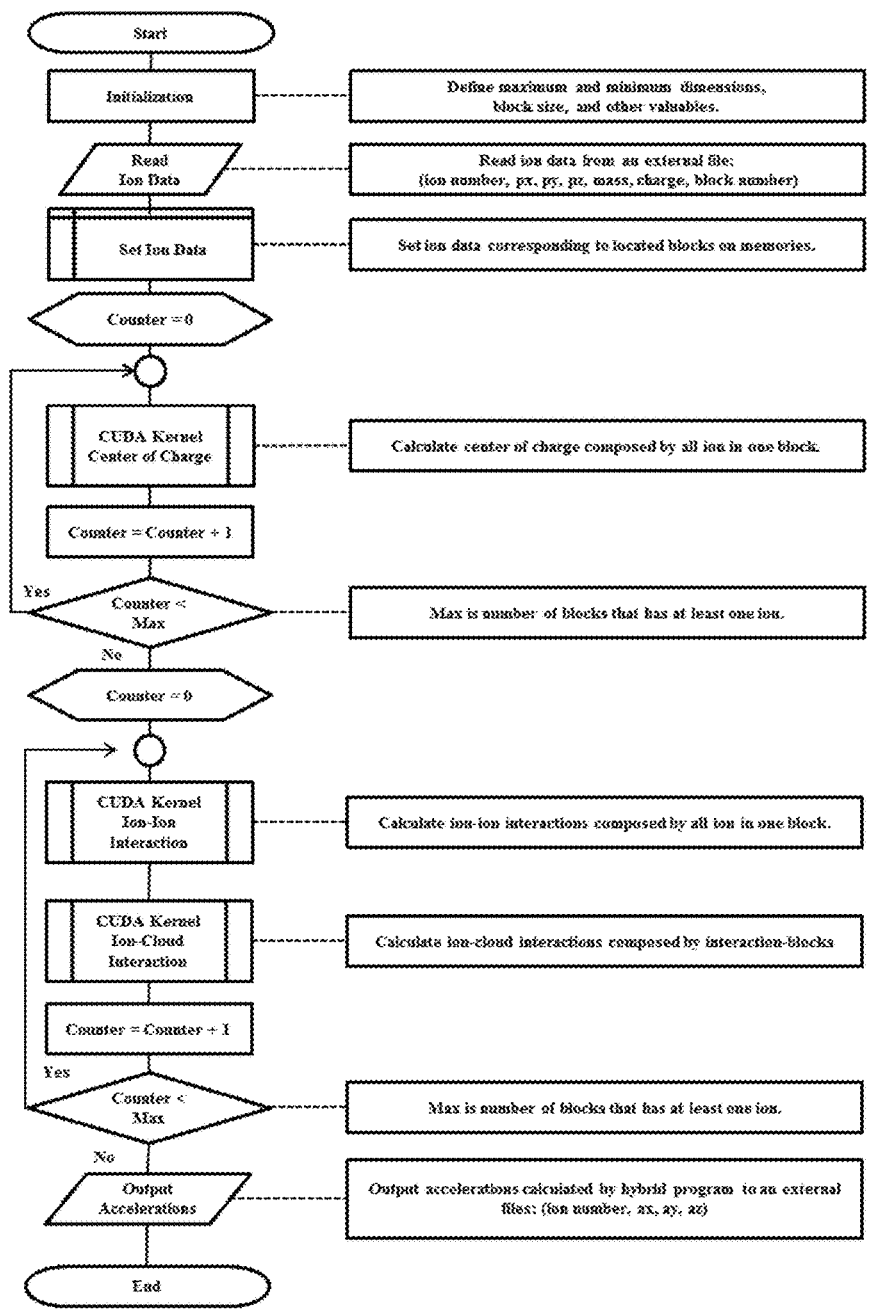
FIG. 3 is a schematic process flow diagram of major processes in the parallel hybrid algorithm.

FIG. 2 is a schematic flow diagram describing the implementation of the parallel CUDA C++ hybrid codes 112 to SIMION 110 trajectory calculation via the user-defined Lua program 114. SIMION 110 communicates with CUDA kernels 116, 118 on GPU via the segment call, segment.accel_adjust. Massively parallel computations occur in the kernels 116, 118. FIG. 3 is a schematic process flow diagram of major processes in the parallel hybrid algorithm (or parallel codes).

Figure 8:
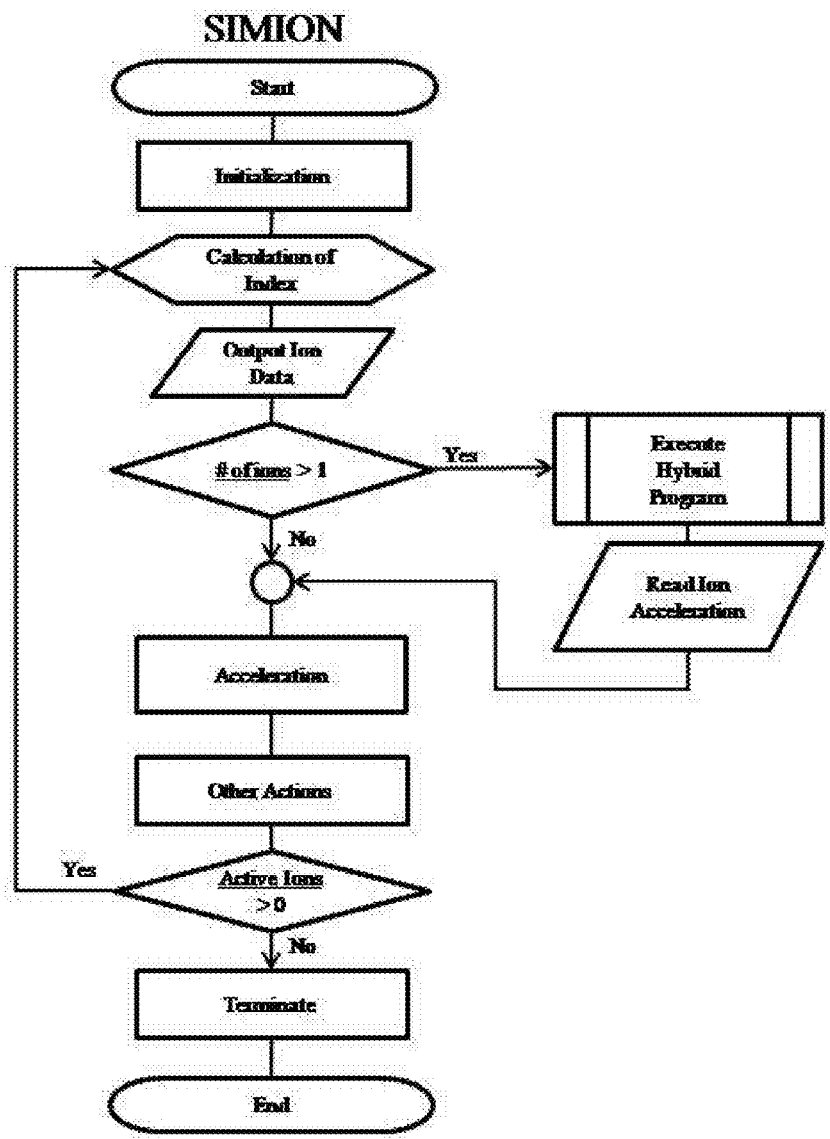
FIG. 8 is a brief flowchart of the Lua user-program with CUDA parallel hybrid method impremented in SIMION.

FIG. 8 is a general flowchart of the Lua user-program with CUDA parallel hybrid method impremented in SIMION.

Figure 9:
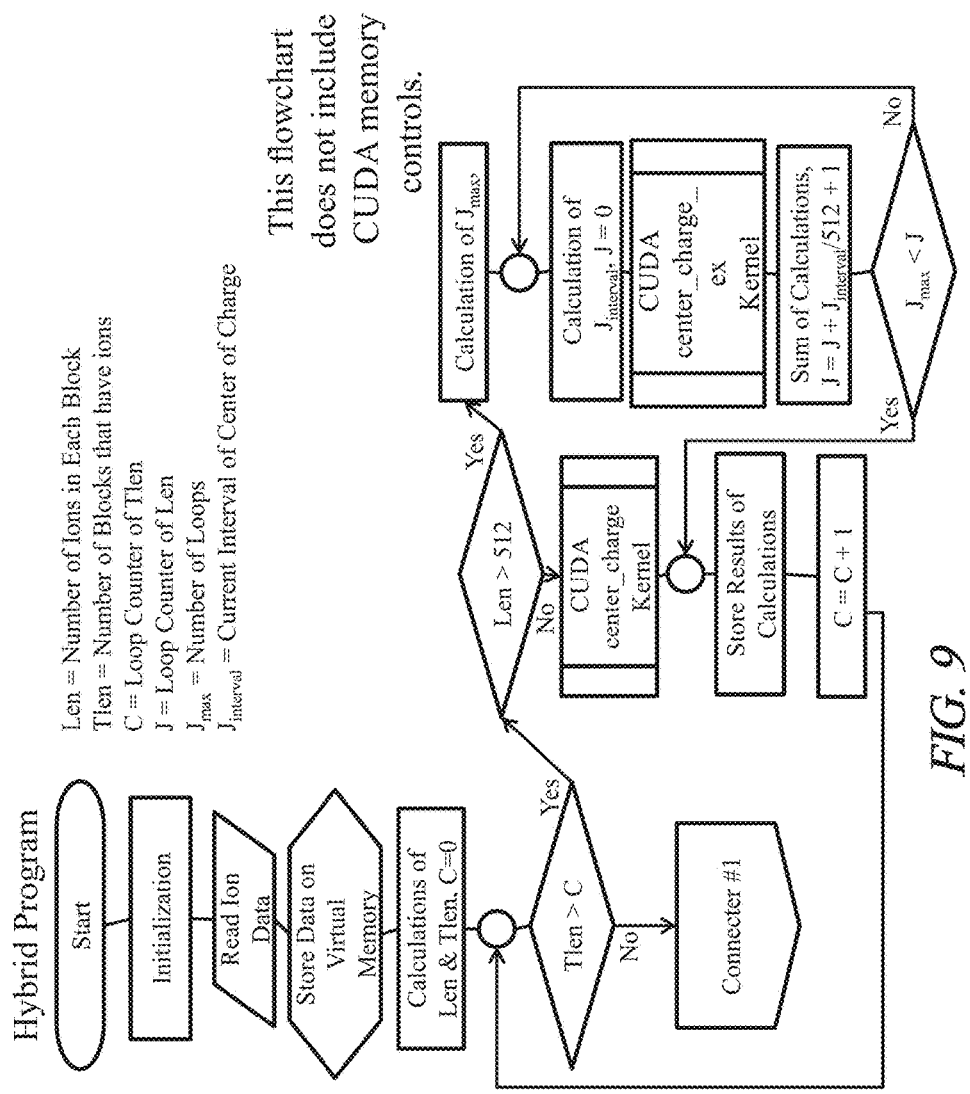
FIG. 9 is a main flowchart (part 1) of the CUDA parallel hybrid program, connected to FIG. 10.
Figure 10:
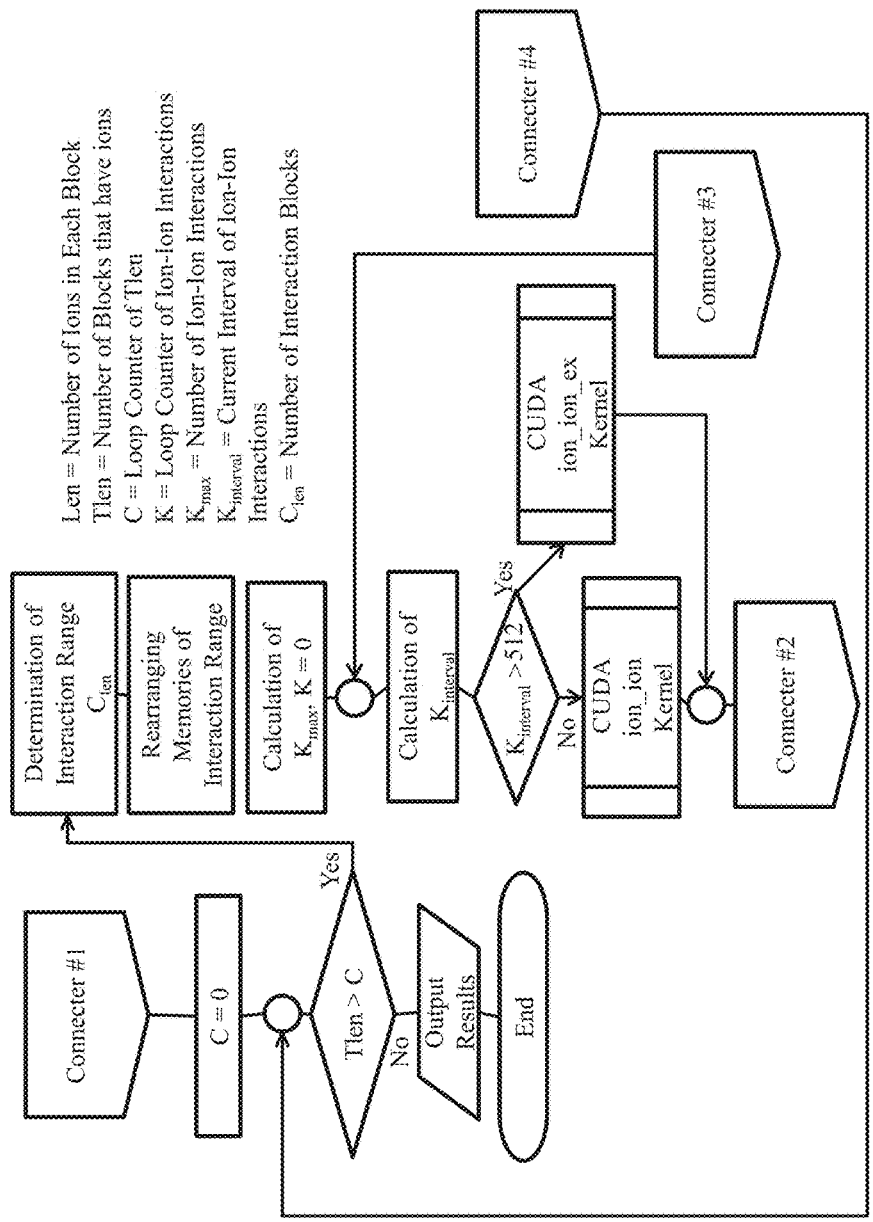
FIG. 10 is a main flowchart (part 2) of the CUDA parallel hybrid program, connected to FIG. 11.

FIG. 9 shows a portion of a detailed flowchart (part 1) of the CUDA parallel hybrid program that is connected (part 2) to FIG. 10. Here, Len=Number of Ions in Each Block; Tlen=Number of Blocks that have ions; C=Loop Counter of Tlen; J=Loop Counter of Len; $J_{max}$=Number of Loops; and $J_{interval}$=Current Interval of Center of Charge.

Figure 11:
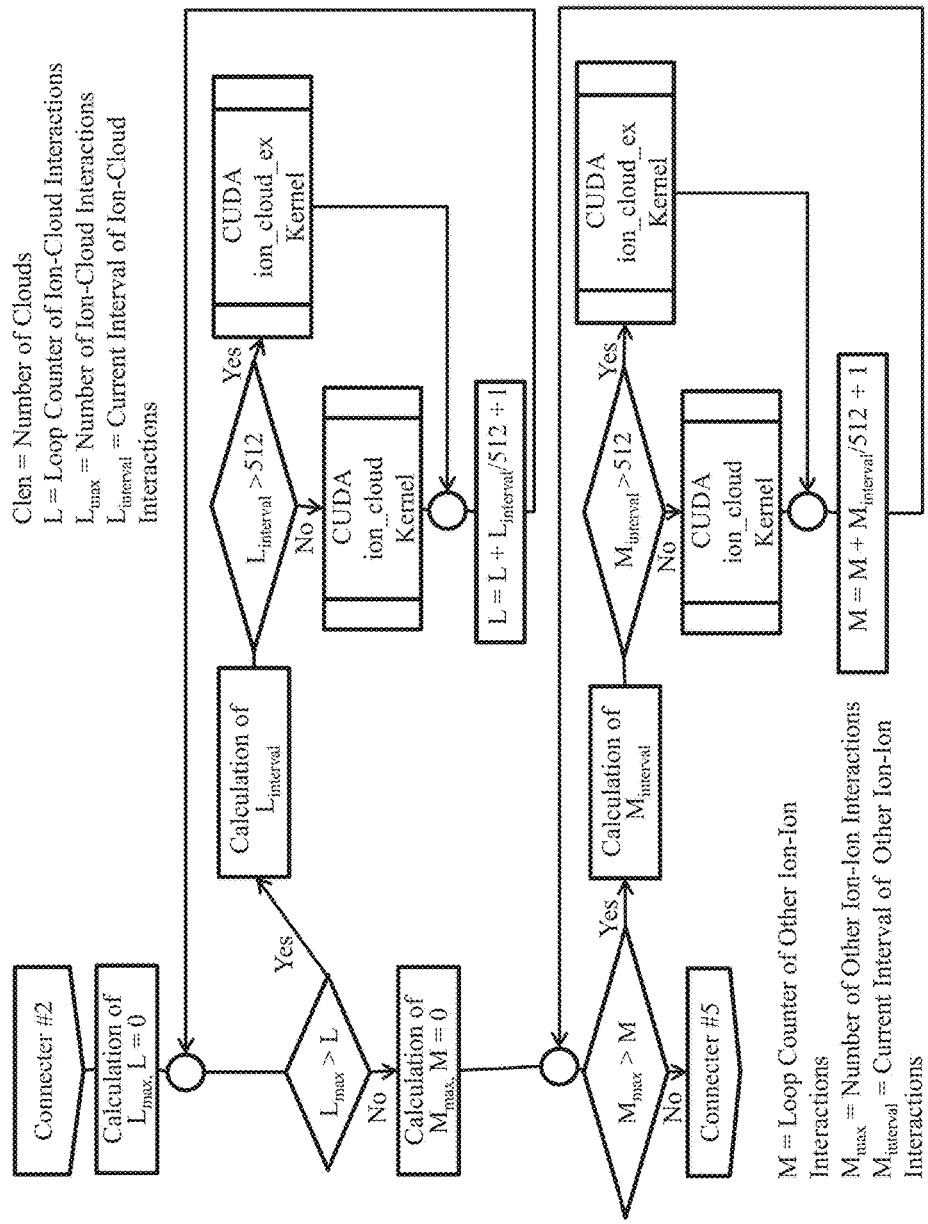
FIG. 11 is a main flowchart (part 3) of the CUDA parallel hybrid program, connected to FIG. 12.

FIG. 10 shows a portion of a detailed flowchart (part 2) of the CUDA parallel hybrid program that is connected (part 3) to FIG. 11. Here, Len=Number of Ions in Each Block; Tlen=Number of Blocks that have ions; C=Loop Counter of Tlen; K=Loop Counter of Ion-Ion Interactions; $K_{max}$=Number of Ion-Ion Interactions; $K_{interval}$=Current Interval of Ion-Ion Interactions; and $C_{len}$=Number of Interaction Blocks.

Figure 12:
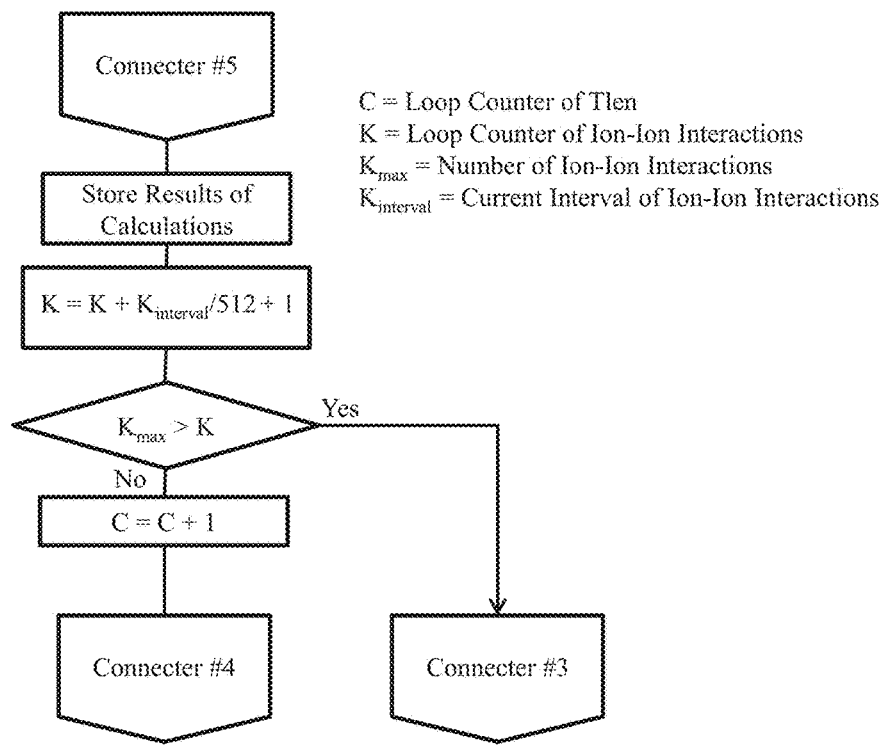
FIG. 12 is a main flowchart (part 4) of the CUDA parallel hybrid program, connected to FIG. 9.

FIG. 11 shows a portion of a detailed flowchart (part 3) of the CUDA parallel hybrid program that is connected (part 4) to FIG. 12. Here, Clen=Number of Clouds; L=Loop Counter of Ion-Cloud Interactions; $L_{max}$=Number of Ion-Cloud Interactions; $L_{interval}$=Current Interval of Ion-Cloud Interactions; M=Loop Counter of Other Ion-Ion Interactions; $M_{max}$=Number of Other Ion-Ion Interactions; and $M_{interval}$=Current Interval of Other Ion-Ion Interactions.

FIG. 12 shows a portion of a detailed flowchart (part 4) of the CUDA parallel hybrid program that is connected (part 1) to FIG. 9. Here, C=Loop Counter of Tlen. K=Loop Counter of Ion-Ion Interactions; $K_{max}$=Number of Ion-Ion Interactions; and $K_{interval}$=Current Interval of Ion-Ion Interactions.

Figure 13:
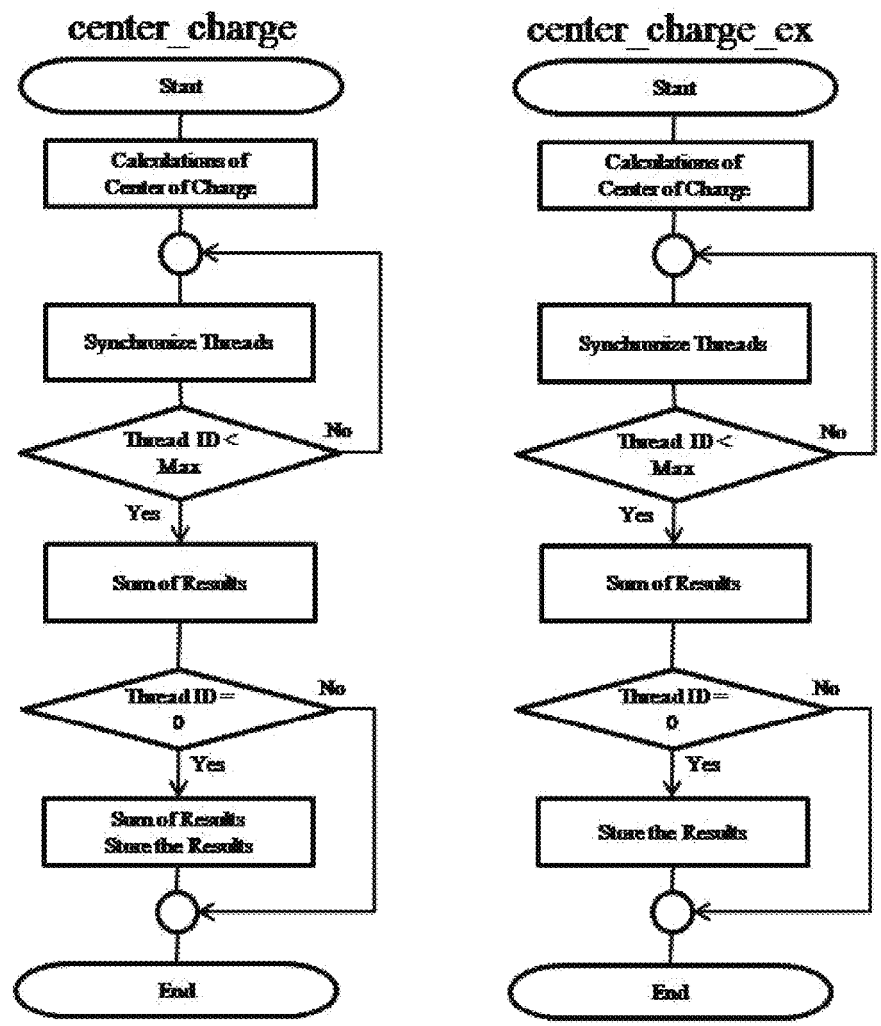
FIG. 13 is a flowchart of the kernal function to calculate center of charges associated with blocks in the CUDA parallel hybrid program.

FIG. 13 is a flowchart of the kernel function to calculate center of charges associated with blocks in the CUDA parallel hybrid program.

Figure 14:
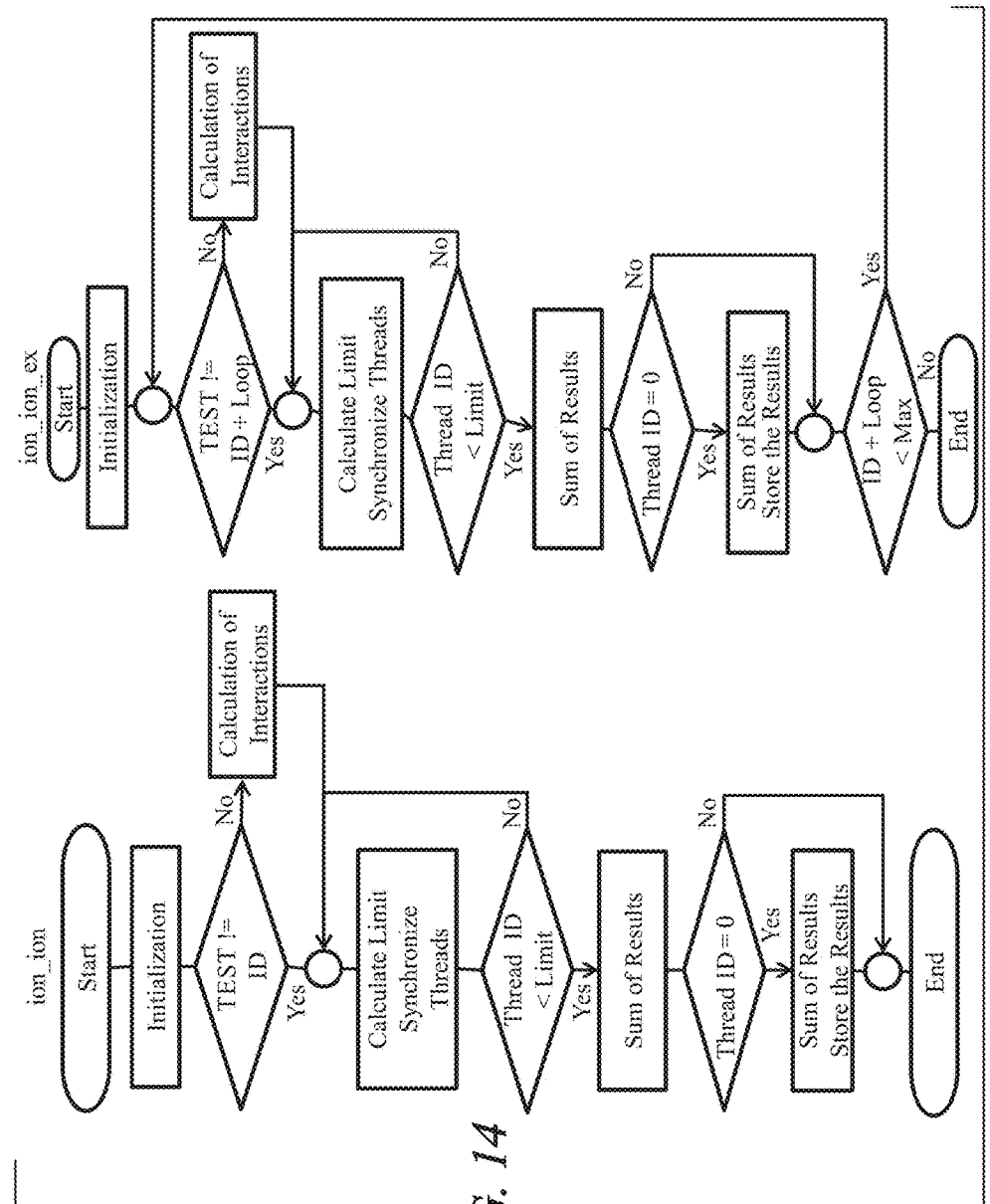
FIG. 14 is a flowchart of the kernal function to calculate ion-ion interactions associated with each block in the CUDA parallel hybrid program.

FIG. 14 is a flowchart of the kernel function to calculate ion-ion interactions associated with each block in the CUDA parallel hybrid program.

Figure 15:
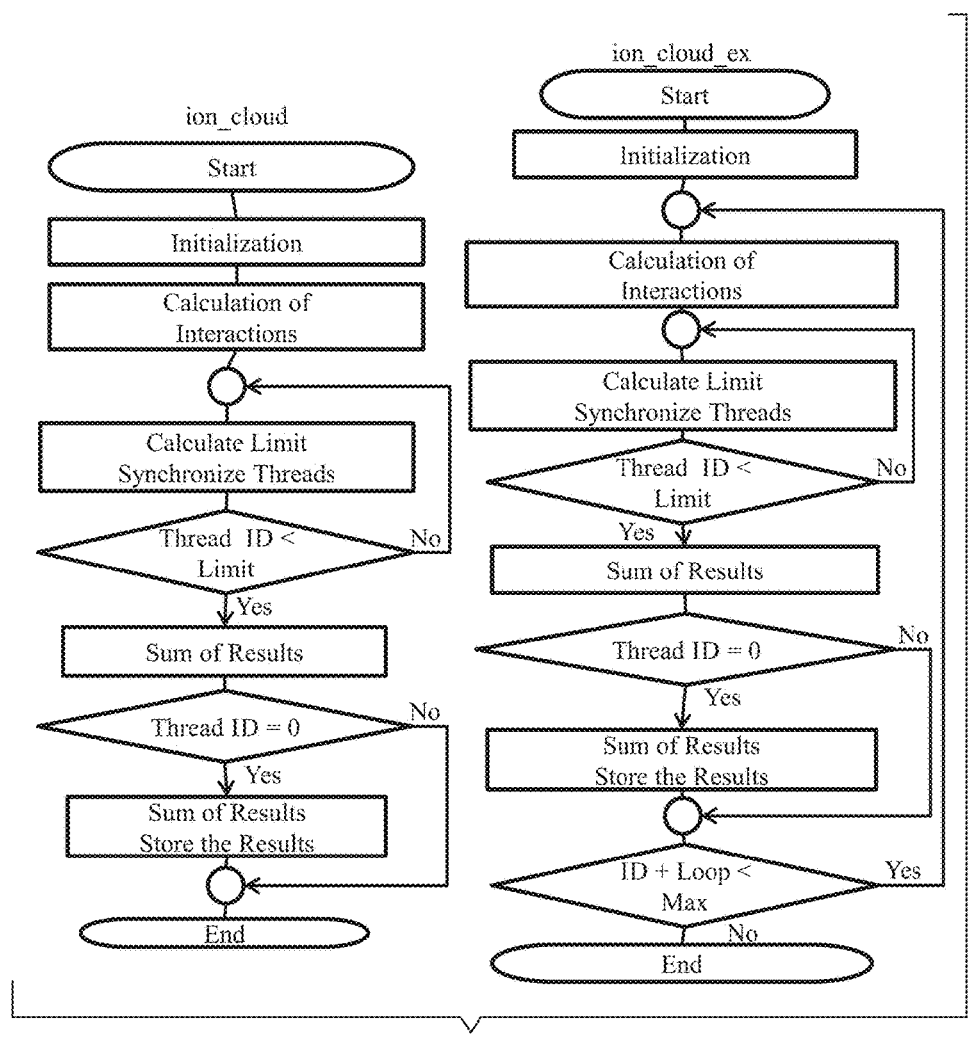
FIG. 15 is a flowchart of the kernal function to calculate ion-cloud interactions associated with each block in the CUDA parallel hybrid program.

FIG. 15 is a flowchart of the kernel function to calculate ion-cloud interactions associated with each block in the CUDA parallel hybrid program.

B. Results and Discussion

Simulation #1 and Simulation #2, as explained below, include the details of simulations and improvements made with GPU acceleration by using the massively parallel computational method.

Simulation #1: Coulomb Explosion

To study how simulation time grows with the number of ions, Coulomb explosion simulations were run of 1000, 8000, 16,000, 32,000, 64,000, 128,000, 512,000, and 1,024,000 singly charged ions, with each ion carrying the mass of 100 amu. The size of the cubic simulation domains were varied as $(40 \text{ mm})^3$, $(80 \text{ mm})^3$, $(98 \text{ mm})^3$, $(124 \text{ mm})^3$, $(160 \text{ mm})^3$, $(196 \text{ mm})^3$, $(320 \text{ mm})^3$, and $(392 \text{ mm})^3$ respectively. For every case, 20×20×20 blocks were used, spanning the entire simulation domain regardless of its size. Ions were given zero kinetic energy and initially normally distributed at the coordinate origin with standard deviations of 1.00 mm, 2.00 mm, 2.52 mm, 3.17 mm, 4.00 mm, 5.04 mm, 8.00 mm, 10.08 mm in any coordinate direction for the case of 1000, 8000, 16000, 64,000, 128,000, 512,000 and 1,024,000 ions, respectively. The short-range interactions were restricted within the center block in which the current ion resides by setting the parameters as $l_x=l_y=l_z=0$, wherein no blocks outside of the center block were included in the short range. The active range was defined by the boundary set by other control parameters, $m_x=m_y=m_z=9$, wherein the long range was limited to ±9 blocks in x-, y-, and z-direction from the center block; hence the entire domain is covered when the ion is in the center block located at the origin. The time it took for each ion to reach the domain boundary was measured, and the simulation was considered "complete" when 90% of the ions had done so. The uniform time step of 50 µs was used.

Figure 4:
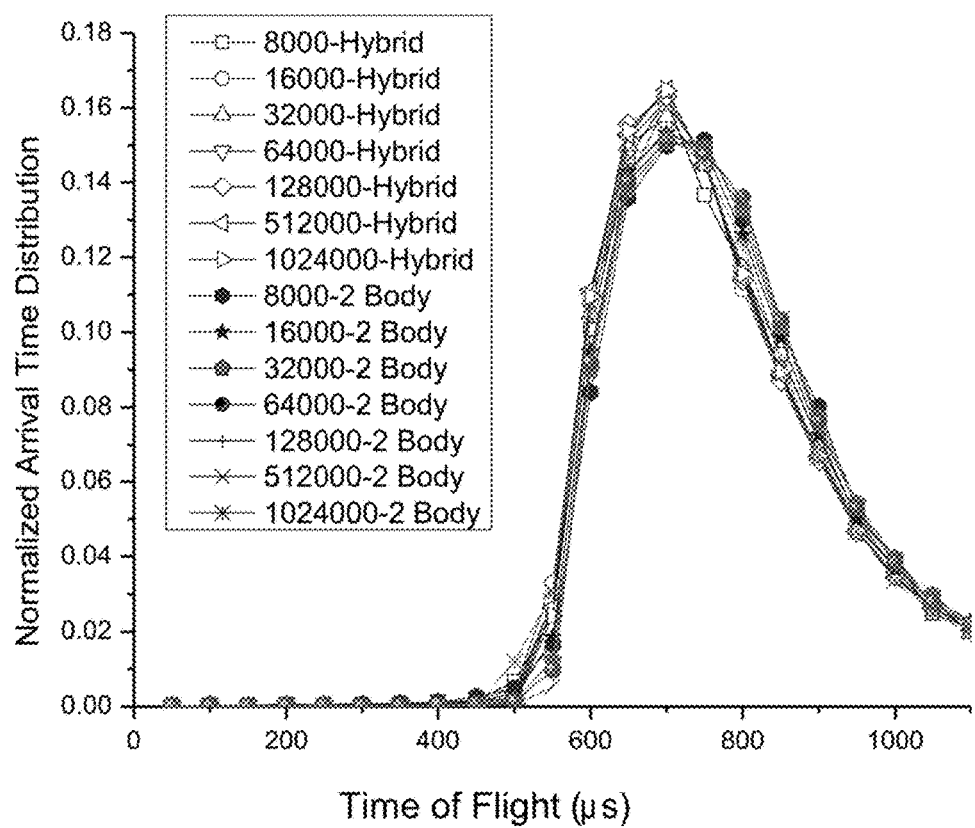
FIG. 4 depicts the normalized arrival time distribution for Coulomb explosion simulations on GPGPU by the parallel hybrid method and the parallel explicit two-body calculation method.

FIG. 4 shows that the arrival time distributions for the simulations by the parallel hybrid algorithm were all similar to those produced by the fully explicit method, regardless of the number of ions. This is the normalized arrival time distribution for Coulomb explosion simulations on GPGPU by the parallel hybrid method and the parallel explicit two-body calculation method. The same number of blocks (20×20×20) was used for every case for the hybrid method regardless of the size of the domain; and the active region was similarly defined in every case. As initial conditions, normally distributed, singly-charged ions carrying 100 amu each were initially released at the center of the domain in the properly-scaled, field-free region. The similarity in results was as expected.

Figure 5:
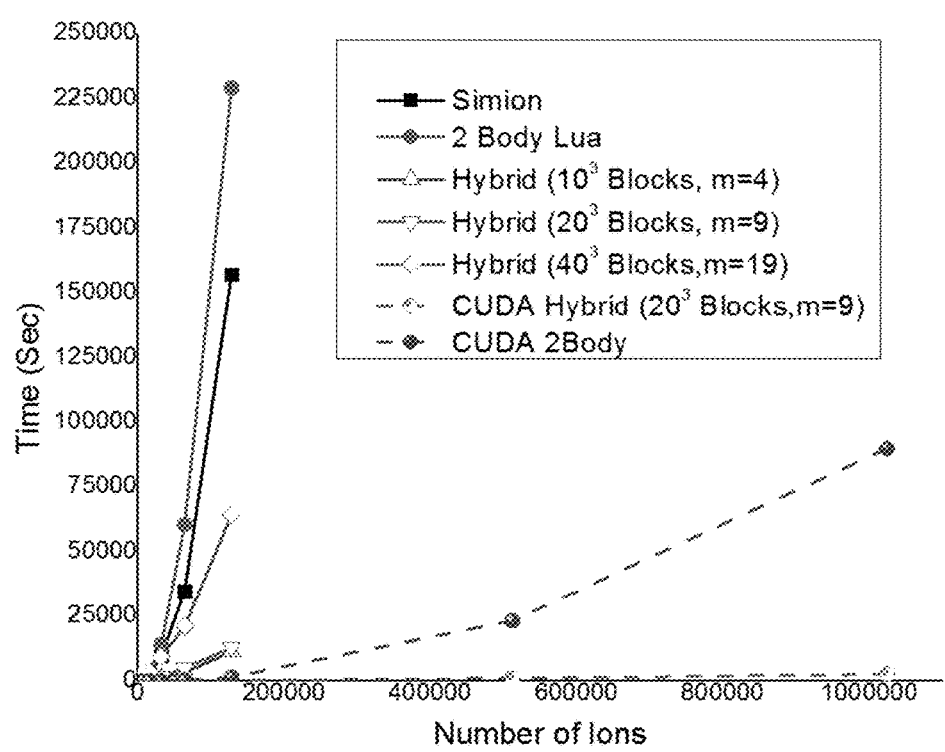
FIG. 5 is a comparison of computational time for Coulomb explosion simulations.

FIG. 5 shows that the effect of GPU acceleration is more apparent when a larger number of ions were involved. This is a comparison of computational time for Coulomb explosion simulations. This summary shows all results from the inventor's previous and current studies. The explicit two-body method results are shown with filled symbols and the hybrid algorithm with open symbols. The effects of varying the size of the active region and the number of blocks, and the performance improvement made by using a GPU, can be seen in FIG. 5. All single thread calculations resulting from the inventors' previous study are shown in solid lines. The case of 128,000 ions only took 309 seconds to complete; with the explicit method—all two-body interactions evaluated (serial codes)—the simulation took 63 hours. That is over 700 times faster performance. In the case of 1,024,000 ions, the simulation using the massively parallel hybrid algorithm took only 2,650 seconds. Accounting for the fact that the CPU time required for a simulation increases much more rapidly as the number of ions flown in the simulations increases, a simulation of such magnitude would take more than a month under the same conditions when only a CPU is used.

Simulation #2: Quadrupole Ion Storage Device

Figure 6:
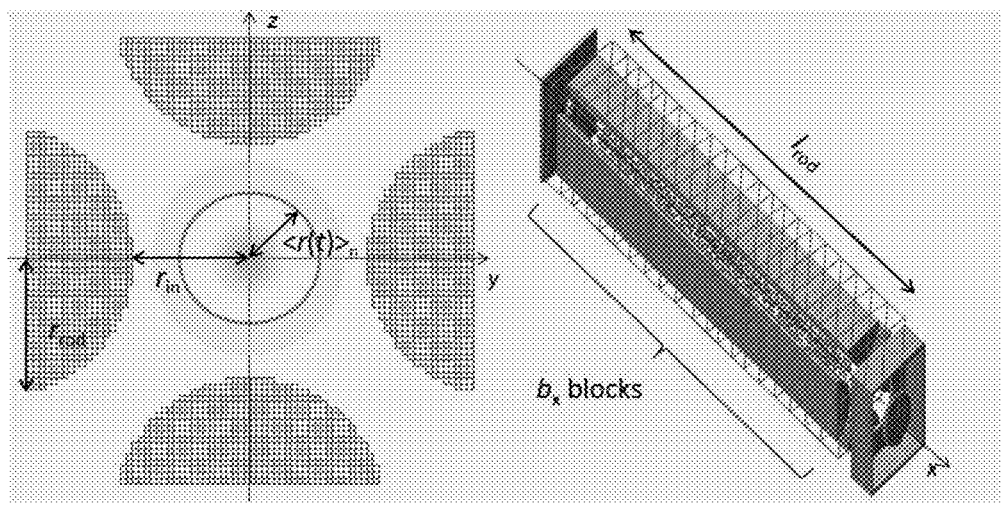
FIG. 6 is a quadrupole ion storage device model, used in the study.

For the modeling of a basic device design of a RF-only quadrupole based ion storage, rectangular blocks in the rectangular domain space were used. FIG. 6 depicts a simple quadrupole ion storage device model used. Variables used in the discussion in the text are defined as shown in the figure: $r_{rod}$ is the radius of a rod electrode; $l_{rod}$ is its length; $r_{in}$ is the distance from the center to the edge of a rod; and $<r(t)>_n$ is the "average radius", the measure of spread of n ions at time t, is the average of ion-to-center distances. $b_x$ is the number of blocks in the x-direction. In this particular example, the model has 20 blocks stacked in x-direction, so $b_x=20$ while no division is made in y- and z-directions; hence, $b_y=b_z=1$. The inscribed radius ($r_{in}$), rod radius ($r_{rod}$), and length of the rod ($l_{rod}$ to be 4 mm, 3.6 mm, and 80 mm, were assigned respectively. Both the entrance and exit electrode plates were separated from the ends of rod electrodes by 4 mm and their voltages were set at 100 V. RF voltage on quadrupole rod electrodes was set at 138 $V_{0-p}$ at 1.1 MHz to maximize the pseudopotential. Neutral Helium (2 mTorr) was used as collisional damping gas. Each of 100,000 ions was assigned the mass of 100 amu. The initial kinetic energies of all ions were set to zero; and the ions were distributed uniformly in the 60 mm×2 mm×2 mm rectangular space located along the longitudinal (x-) axis, i.e. at the center of the quadrupole configuration at the time of release. Ion-neutral collisions were simulated by using the Collision Model HS1 and the found in the newer version of SIMION manual. D. Manura, D. Dahl., "SIMION (R) 8.0 User Manual" (2008), Scientific Instrument Services, Inc. Ion-neutral collisions can also be improved by converting the code in parallel. To improve performance, the present invention parallelizes the the two main processes, kernels 116, 118 shown in FIG. 2.

Returning to FIG. 6, the block dimensions were defined by setting the number of blocks as $b_x=20$ and $b_y=b_z=1$, with active region parameters with as $l_x=l_y=l_z=0$ and $m_x=m_y=m_z=1$. Hence, the domain contains a single layer of blocks stacked in x-direction; and the ions in the short range are in the same block as the current ion; and the ion-cloud interactions are limited to two blocks immediately adjacent to the center block. At every time step, the ions' average distance to the x-axis was calculated; and the average was recorded as the "average radius" of the distribution at that time; and the simulation was continued until the equilibrium was reached. The progress of average radius and convergence to its equilibrium for the simulation of 100,000 ions is shown in FIG. 7.

Figure 7:
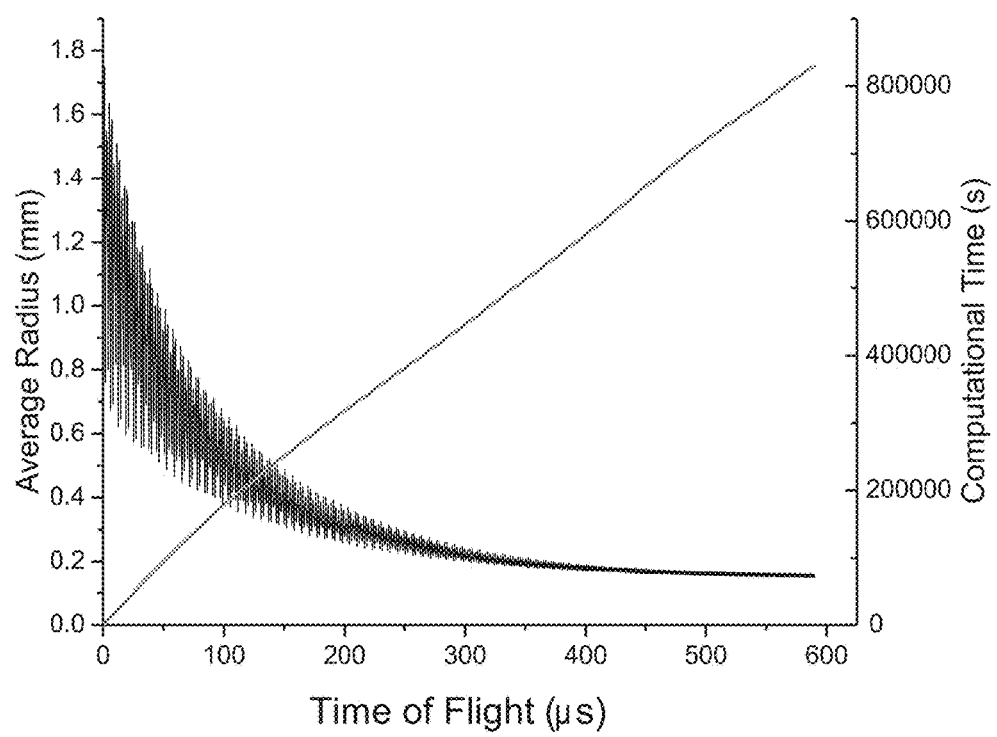
FIG. 7 depicts the relationship of time of flight (between 0 μs and 600 μs) to either computational time or the average radius of the ion distribution, in a simulation with 100,000 ions in a basic RF-only quadrupole ion storage device model.

FIG. 7 depicts the progress of the average radius of the ion distribution for 0<time of flight <600 µs in a simulation with 100,000 ions in a basic RF-only quadrupole ion storage device model. The result is very similar to the simulation of 5,000 ions performed with the explicit calculation method in the inventors' previous study; and the inventors did not see a significant deviation from the limit observed in the simulation of 5,000 ions. As expected, only a very small deviation in limits was observed, the average radius at 600 µs into the simulation with 100,000 ions and that of 5,000 ions obtained by the explicit method from the inventors' previous study.

Parallelization had much greater effect on the ion storage device than Coulomb explosion simulation. The 600-µs ion storage simulation of 100,000 ions was completed in only about 10 days on hardware with added GPU power. The total number of time steps (ranging from 0.02 to 0.025 µs) required for all processes were approximately ~25,000 steps compared to ~25 steps, the number of time steps required for the Coulomb explosion simulation. When the explicit method is used, two-body Coulomb interaction calculations must be repeated approximately 1,000 times more for the ion storage simulation than the Coulomb explosion simulation containing the same number of ions; hence, approximately 1,000 times computation time is expected. Based on this basic comparison, the time for completing the simulation explicitly calculating each and every two-body interactions is expected to require approximately 5 to 7 years to complete.

One embodiment of the present invention is written for GPGPU. The massively parallel hybrid codes of the present invention work much more efficiently and as accurately as the fully explicit method on the CPU-only system. The Coulomb explosion simulation of 128,000 ions was over 700 times faster, and resulted in successfully simulating over a million ions within a couple of thousand seconds. The simulation of a quadrupole ion storage device with 100,000 ions, and the 600-μs simulation with 25,000 time steps was completed only in about 10 days, which may take 5-7 years if done with the explicit method. The algorithm can be effective in speeding up SIMION trajectory calculations for any generic device designs that involve large scale calculations of more than a million ions.

Figure 16:
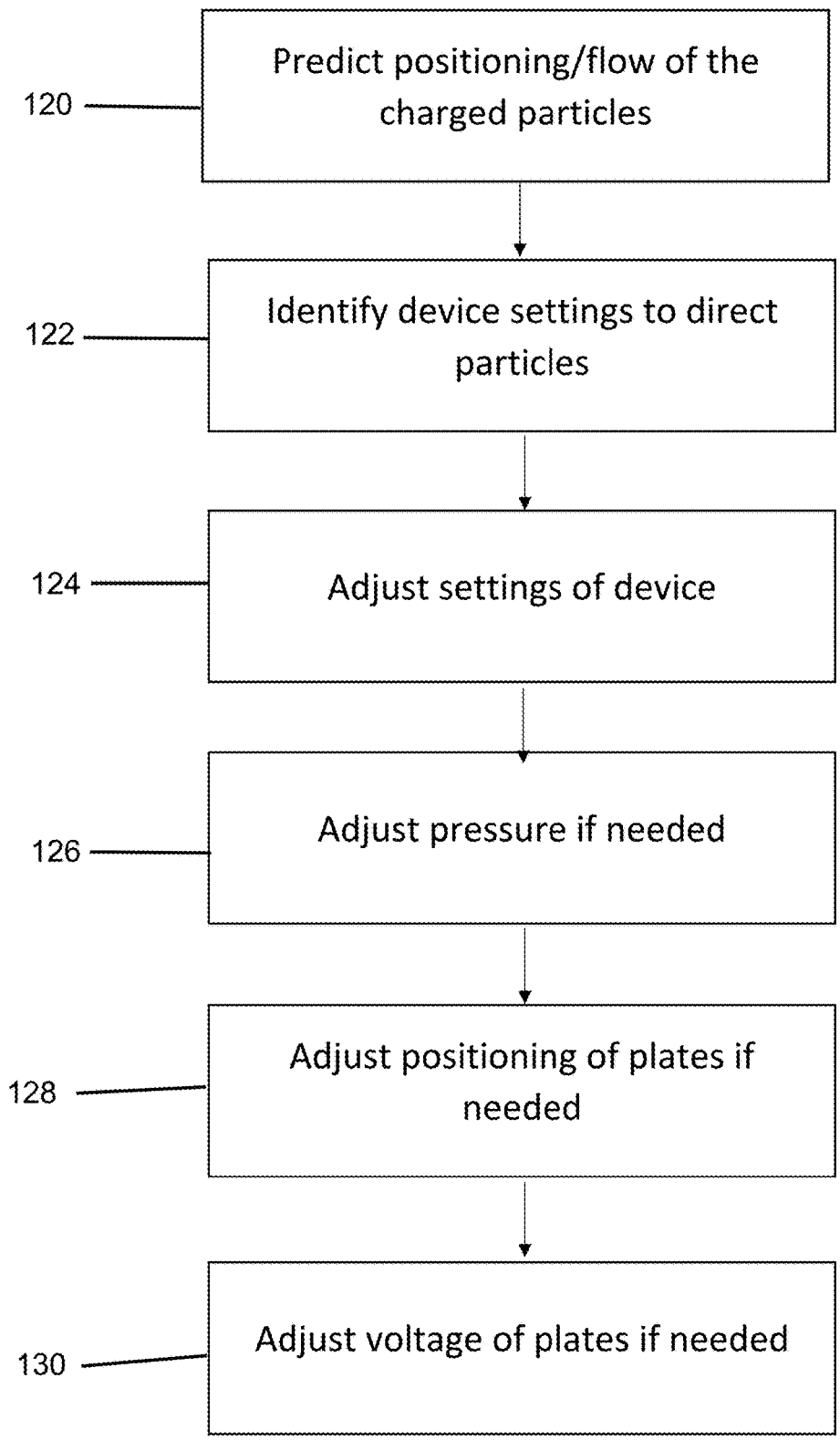
FIG. 16 is a flowchart showing the operation of a charged particle flow device.

FIG. 16 shows a flowchart showing operation of a charged particle flow device according to the system. As indicated above, the charged particle flow device may provide a charged plate. The characteristics of the charged plate may vary to affect operation of the charged particle flow device. The positioning of the charged plate may vary to direct the flow of the charged particles. The actual location of the charged plate within the charged particle flow device may adjust. The orientation of the charged plate within the charged particle flow device may also adjust.

In another embodiment, the charged particle flow device may operate without a charged plate. Such an embodiment can vary operation by adjusting the pressure within the charged particle flow device. The pressure may be increased to increase the force on the charged particles. The pressure may also be reduced to decrease the force on the charged particles.

The pressure within charged particle flow devices with charged plates may also occur. The system may increase or decrease the pressure within the charged particle flow device to direct the flow of the charged particles.

The system predicts the positioning/flow of the charged particles at Step 120. The system then identifies the settings of the charged particle flow device that may be adjusted at Step 122. These settings may affect the flow/positioning of the charged particles to achieve the desired results.

The system may then adjust these settings of the charged particle flow device at Step 124. As discussed above, these settings may include 1) changing pressure within the charged particle flow device, 2) adjusting the positioning of the plates if needed, and 3) adjusting voltage of the plates if needed.

The system predicts the flow and positioning of the charged particles. This prediction requires less computation and time. The system can then adjust the settings to achieve the desired results concerning the positioning of the charged particles and the flow of the charged particles.

The system may adjust the pressure within the charged particle device at Step 126. As discussed above, the change in the pressure within the device affects the force acting upon the charged particles. This pressure can be reduced or increased to change the pressure acting upon the charged particles.

The system may adjust the positioning of the charged plates within the charged particle device at Step 128. As discussed above, the change in the positioning of the plates within the device affects the flow of the particles as the charge occurs at different locations within the device. This change in location of the plates affects the flow of the charged particles. The system positions the plates adjusting the location of the charged plate within the charged particle flow device, the orientation of the charged plated within the charged particle flow device, or both the location and orientation of the charged plate within the charged particle flow device.

The system may adjust the voltage of the charged plates within the charged particle device at Step 130. The change in the voltage of the plates within the device affects the flow of the charged particles.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of controlling a charged particle flow device in which charged particles flow wherein characteristics of the device are adjusted to direct the flow of charged particles through a device by approximating a force on an ion with a computing device, the method comprising:

the computing device establishing a simulation domain, a maximum number of blocks, a limit of short range interactions, and a limit of long range interactions;

the computing device calculating the dimensions of the blocks;

the computing device accessing ion data, the ion data comprising:

an ion identifier;

a position of the ion;

a charge of the ion;

a block identifier identifying the block in which the ion is located;

the computing device calculating the force on each ion found within the ion data wherein the computing device calculates the force from each ion found within the short range interactions and the long range interactions wherein the calculation of the long range interactions is an approximation;

wherein the step of calculating the force on each ion further comprises:

identifying a set of intermediate ions in which the set of intermediate ions is comprised of the ions outside of the limits of the short range interactions and within the limits of the long range interactions;

identifying at least one cloud of each block within which at least one ion from the set of intermediate ions is located;

calculating a center of charge of each cloud according to the coordinates of the ion and the charge of the ion;

calculating interactions between the ion and the at least one cloud to determine the flow of the charged particles through the charged particle flow device; and a charged plate located at a position and having an orientation and a voltage within the electron flow device wherein the computing device identifies at least one of the position, the voltage, or the orientation of the charged plate to be adjusted to direct the flow of the charged particles; and adjusting the position, the voltage, or the orientation of the charged plate within the charged particle flow device.

2. The method of claim 1 further comprising:

adjusting the position of the charged plate.

3. The method of claim 2 further comprising:

adjusting the voltage of the charged plate.

4. The method of claim 1 further comprising:
the charged particle flow device operating at a pressure; and
the system adjusting the pressure within the charged particle flow device.

5. The method of claim 1 further comprising:
adjusting the voltage of the charged plate.

6. The method of claim 1 further comprising:
adjusting the orientation of the charged plate within the charged particle flow device.

7. The method of claim 1, the step of calculating the center of charge of each cloud further comprising:
calculating a total charge of the block; and
calculating coordinates of the center of charge of the cloud.

8. The method of claim 7 further comprising:
calculating the interactions between the ion and the at least one cloud according to a two body interactions formula calculated with the center of charge of the cloud and the total charge of the cloud instead of the individual charges and locations of the ions of the set of intermediate ions.

9. The method of claim 1 further comprising:
ignoring the ions outside of the limits of the long range interactions.

10. A method of controlling a charged particle flow device in which charged particles flow wherein characteristics of the device are adjusted to direct the flow of charged particles through a device by approximating a force on an ion with a computing device, the method comprising:
the computing device establishing a simulation domain, a maximum number of blocks, a limit of short range interactions, and a limit of long range interactions;
the computing device calculating the dimensions of the blocks;
the computing device accessing ion data, the ion data comprising:
an ion identifier;
a position of the ion;
a charge of the ion;
a block identifier identifying the block in which the ion is located;
the computing device calculating the force on each ion found within the ion data wherein the computing device calculates the force from each ion found within the short range interactions and the long range interactions wherein the calculation of the long range interactions is an approximation;
wherein the step of calculating the force on each ion further comprises:
identifying a set of intermediate ions in which the set of intermediate ions is comprised of the ions outside of the limits of the short range interactions and within the limits of the long range interactions;
identifying at least one cloud of each block within which at least one ion from the set of intermediate ions is located;
calculating a center of charge of each cloud according to the coordinates of the ion and the charge of the ion;
calculating interactions between the ion and the at least one cloud to determine the flow of the charged particles through the charged particle flow device;
a charged plate located at a position and having an orientation and a voltage within the electron flow device wherein the computing device identifies at least one of the position, the voltage, or the orientation of the charged plate to be adjusted to direct the flow of the charged particles; and
adjusting the position, the voltage, or the orientation of the charged particle flow device.

11. The method of claim 10 further comprising:
adjusting the position of the charged plate.

12. The method of claim 11 further comprising:
adjusting the voltage of the charged plate.

13. The method of claim 12 further comprising:
the charged particle flow device operating at a pressure;
the system adjusting the pressure within the charged particle flow device.

14. The method of claim 12 wherein the computing device adjusts the position of the charged plate.

15. The method of claim 10 further comprising:
adjusting the voltage of the charged plate.

16. The method of claim 15 wherein the computing device adjusts the voltage of the charged plate.

17. The method of claim 10 further comprising:
adjusting the orientation of the charged plate within the charged particle flow device.

18. A method of controlling a charged particle flow device in which charged particles flow wherein characteristics of the device are adjusted to direct the flow of charged particles through a device by approximating a force on an ion with a computing device, the method comprising:
the computing device establishing a simulation domain, a maximum number of blocks, a limit of short range interactions, and a limit of long range interactions;
the computing device calculating the dimensions of the blocks;
the computing device accessing ion data, the ion data comprising:
an ion identifier;
a position of the ion;
a charge of the ion;
a block identifier identifying the block in which the ion is located;
the computing device calculating the force on each ion found within the ion data wherein the computing device calculates the force from each ion found within the short range interactions and the long range interactions wherein the calculation of the long range interactions is an approximation;
wherein the step of calculating the force on each ion further comprises:
identifying a set of intermediate ions in which the set of intermediate ions is comprised of the ions outside of the limits of the short range interactions and within the limits of the long range interactions;
identifying at least one cloud of each block within which at least one ion from the set of intermediate ions is located;
calculating a center of charge of each cloud according to the coordinates of the ion and the charge of the ion;
calculating interactions between the ion and the at least one cloud to determine the flow of the charged particles through the charged particle flow device;
the charged particle flow device operating at a pressure;
the system adjusting the pressure within the charged particle flow device.

19. The method of claim 18 wherein the computing device adjusts the pressure within the charged particle flow device.

20. The method of claim 18 wherein the computing device adjusts a position of a charged plate, an orientation of the charged plate, or a voltage of a charged plate within the charged particle flow device.

* * * * *